United States Patent [19]

Brant et al.

[11] Patent Number: 5,317,070
[45] Date of Patent: May 31, 1994

[54] SYNDIOTACTIC HOT MELT ADHESIVE

[75] Inventors: Patrick Brant, Seabrook, Tex.; Kenneth O. McElrath, Jr., Chause de Waterloo, Belgium; Martha H. Robertson, Zachary, La.

[73] Assignee: Exxon Chemical Patents, Inc., Linden, N.J.

[21] Appl. No.: 935,483

[22] Filed: Aug. 25, 1992

Related U.S. Application Data

[63] Continuation-in-part of Ser. No. 610,219, Nov. 9, 1990, abandoned.

[51] Int. Cl.$^5$ .................... C08L 23/10; C09J 123/10
[52] U.S. Cl. .................... 526/348.5; 526/348.2; 526/348.3; 526/348.6; 526/351; 525/240; 156/334
[58] Field of Search ................ 526/348.2, 935, 348.3, 526/348.5, 348.6, 351; 156/334; 525/240

[56] References Cited

U.S. PATENT DOCUMENTS

| | | | |
|---|---|---|---|
| 3,258,455 | 6/1966 | Natta et al. | 526/351 X |
| 3,305,538 | 2/1967 | Natta et al. | 526/351 X |
| 3,700,758 | 10/1972 | Johnson, Jr. et al. | 526/290 X |
| 4,892,851 | 1/1990 | Ewen et al. | 526/160 |
| 4,937,138 | 6/1990 | Mostert | 428/286 |

FOREIGN PATENT DOCUMENTS

| | | |
|---|---|---|
| 351392 | 5/1989 | European Pat. Off. . |
| 387690 | 9/1990 | European Pat. Off. . |
| 387691 | 9/1990 | European Pat. Off. . |

*Primary Examiner*—Fred Teskin
*Attorney, Agent, or Firm*—Catherine L. Bell; Myron B. Kurtzman

[57] ABSTRACT

A hot melt adhesive including syndiotactic polypropylene having a polymer chain of at least 80% racemic dyads and having a melting point of about 100° C. to 180° C.

21 Claims, 5 Drawing Sheets

SYNDIOTACTIC HOT MELT ADHESIVE

This invention is a continuation-in-part of U.S. Ser. No 610,219, filed Nov. 9, 1990, now abandoned.

FIELD OF THE INVENTION

The invention relates to hot melt adhesives comprised of syndiotactic polymers and a tackifier.

BACKGROUND OF THE INVENTION

A class of adhesive compositions known as thermoplastic or hot melt adhesives have enjoyed continually increasing usage in many industrial applications. These adhesives, or hot melts, as they are commonly designated, are solid or semisolid combinations of film forming resins, tackifying resins, rubbery polymers, plasticizers, waxes and similar materials which are added to the adhesive composition in order to impart various properties thereto.

Adhesive bonds derived from hot melts are particularly useful because (1) they are 100 percent solid materials and (2) they quickly form tough adhesive bonds simply by cooling—i.e. no need for solvent evaporation, etc.

Adhesive derived from hot melts are particularly useful because of their very rapid set up or bonding time. Strong bonds are formed when the adhesive cools below its melt point and crystallizes. There is no long wait for solvent or water evaporation or for chemical curing as with other type adhesives. chemical curing as with other type adhesives. Depending on composition, hot melt adhesives can be prepared having good tack, high bond strength, good flexibility, low temperature properties, good environmental resistance etc.

A typical class of hot melt adhesive composition utilizes polyolefin polymers as the base or carrier material. The polyolefin base is usually blended with other polymers and copolymers, resin tackifiers and with modifiers and additives.

SUMMARY OF THE INVENTION

Therefore, it is one object of the invention to provide a hot melt adhesive having: (1) a high softening temperature; (2) improved toughness; (3) slow crystallization kinetics which result in longer "open times" between the application of the adhesives and the formation of the joint; or (4) less shrinkage than corresponding isotactic polypropylene or ethylene/vinyl acetate based adhesives.

These and other objects are accomplished by the present invention which provides a hot melt adhesive comprising syndiotactic polypropylene having a polymer chain including at least 80% racemic dyads and having a melting point of about 100° C. to 180° C., preferably 100° to 160° C.

DETAILED DESCRIPTION OF THE PREFERRED EMBODIMENTS

The present invention comprehends making a hot-melt adhesive using syndiotactic polypropylene having a polymer chain including at least 80% racemic dyads, preferably 85%, and having a melting point between about 100° C. and 180° C., preferably 100° to 160° C.

As is known in the art, the structure and properties of syndiotactic polypropylene (SPP) differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula the stereochemical sequence of isotactic polypropylene is described as follows:

Another way of describing the structure is through the use of NMR. Bovey's NMR nomenclature for an isotactic pentad is ... mmmm ... with each "m" representing a "meso" dyad of successive methyl groups on the same side of the plane. As known in the art, any deviation or inversion of the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

In NMR nomenclature, this pentad is described as .. . rrrr ... in which each "r" represents a "racemic" dyad, i.e. successive methyl groups on alternate sides of the plane. The percentage of r dyads in the chain determines the degree of syndiotacticity of the polymer. This crystallinity distinguishes both syndiotactic 1 and isotactic polymers from atactic polymers. Atactic polymers exhibit no regular order of repeating unit configurations in the polymer chain and form essentially a non-crystalline product.

Most of the syndiotactic polypropylene produced previously as described in such references as U.S. Pat. Nos. 3,305,538 and 3,258,455 to Natta et al have produced syndiotactic polymers having the following structure:

or in NMR nomenclature ... rrrrrmrrrr ...

The polymer chain used in producing the hot melt adhesives of this invention preferably consists of greater than 80% racemic dyads, and more preferably greater than 85% racemic dyads. A method for producing SPP of this type is described in published.

European Patent Application Ep 351,391 A2, the entire disclosure of which is hereby incorporated by reference. Some catalysts which are suitable for producing the meso triad SPP of the present invention are described in U.S. Pat. No. 4,892,851 to Ewen et al., the entire disclosure of which is hereby incorporated by reference.

An important feature of these syndiotactic polypropylenes is that they have lower heats of fusion than the corresponding isotactic polymers. Another important feature which distinguishes SPP from IPP is that SPP exhibits two endothermic peaks at temperatures greater than 100° C. as determined by differential scanning-calorimetry.

The SPP polymers and copolymers of this invention may be blended with one or more tackifiers, such as aliphatic hydrocarbon resins prepared by the polymerization of monomers consisting primarily of olefins and diolefins and hydrogenated forms of these aliphatic hydrocarbon resins. These tackifying resins typically exhibit a Tg of −30° to 65° C., and a ring and ball softening point of 12° to 100 ° C. Examples include but not are not limited to hydrocarbon resins available under the tradenames ECR143H, and ESCOREZ 1310 available from Exxon Chemical Company. Further tackifiers include the hydrocarbon products of the distillation of oil, particularly, hydrogenated cyclic resins with a Tg of −14° C. to −70° C. and a ring and ball softening point of 18° to 130° C. Examples include but are not limited to those resins available from Exxon Chemical under the tradename ECR-327, ESCOREZ 5380 and ESCOREZ 5320. These hydrogenated cyclic resins have the properties shown in Table X below.

faulty joint. On solidification, the syndiotactic polypropylene based hot melt adhesive of this invention exhibits less shrinkage than corresponding isotactic polypropylene or ethylene/vinyl acetate based adhesives.

It has been found that the compositions of this invention can be heated to temperatures up to 110° C. without failure of the adhesive bond. Thus, compositions are provided which have the distinct advantage of high temperature strength needed in certain applications.

While syndiotactic polypropylene homopolymer can be used in the hot melt adhesive of the invention, syndiotactic polypropylene copolymers can also be used. Suitable comonomers include $C_2$ and $C_4$ to $C_{12}$ alpha-olefins, particularly alpha-olefin comonomers such as ethylene, 1-butene, 1-pentene, 1-hexene, 1-heptene, 1-octene, particularly 1-hexene. Furthermore, the comonomers are present of from 0.01 to about 50 weight %, based upon the weight of the copolymer, preferably 3 to 40 weight %, more preferably 6 to 20 weight %, even more preferably 12 to 17 weight %. The hot melt adhesive of the invention is particularly useful in situations where one or both of the substrates is an engineering polypropylene such as two interior panels of a car. The propylene 1-hexene copolymers, also provide good bonding of dissimilar substrates. A hot melt adhesive according to this invention is typically produced by melting syndiotactic polypropylene and a tackifier in a ratio of 1:1 in a stirred container. The syndiotactic polypropylene and tackifier dissolve in each other to form a viscous melt which can be applied as a melt adhesive at high temperatures. The adhesive subsequently solidifies as the temperature is decreased to form a bond between adjacent substrates, such as two pieces of carpet or two automobile interior panels.

The preferred compositions of this invention include from about 40 weight percent to about 70 weight percent of a tackifying resin or combination of tackifying resins and about 30 to about 60 weight percent of syndiotactic polymer of copolymer. The more preferred

TABLE X

| Resin | Softening Point °C. | Melt Viscosity (cps) | Mw | Mn | Mw/Mn | Tg C (DSC) |
|---|---|---|---|---|---|---|
| ECR327 | 18 | 2320(50° C.) | 165 | 76 | 2.2 | −14 |
| ECR143H | 12 | 2400(50° C.) | 462 | 342 | 1.35 | −26 |
| ESCOREZ 5380 | 85 | 400(148° C.) | 420 | 320 | 1.3 | 30 |
| ESCOREZ 5320 | 125 | 22,000(148° C.) | 460 | 360 | 1.3 | 70 |
| ESCOREZ 1310LC | 93 | 1400(148° C.) | 1250 | 840 | 1.5 | 36 |

The polymers used in the present invention's hot melt adhesive generally have molecular weights between about 10,000 and 150,000, preferably between about 30,000 and about 100,000.

Further, because syndiotactic polypropylene is non-polar, the adhesives of the invention will wet olefinic substrates more effectively than the ethylene/vinyl acetate copolymer based hot melt adhesives commonly used.

The hot melt adhesives of the invention have a softening temperature of about 120° C. to about 150° C., and a melting point between 90° C. and 180° C., if one exists. This is a substantially higher softening temperature than the ethylene/vinyl acetate type tackifiers.

The hot melt adhesives of this invention also have good "open times" between the application of the adhesives and the formation of the joint. Good open time means sufficient time for correction of formation of a compositions include about 50 to about 60 weight percent of tackifying resin and about 40 to about 50 weight percent syndiotactic polypropylene polymer. An additional and optional component of the composition may be an antioxidant present at about 0.1 to about 1.5 weight percent, preferably about 0.25 to about 0.1 weight percent based upon the weight of the composition.

EXAMPLES 1–16

In the following examples propylene alphaolefin polymer was blended with tackifier such that the polymer and tackifier dissolved into each other. The types, proportions and properties of blends, are identified in Table A below. The samples were then tested for SAFT, and/or PAFT and T-peel. The testing conditions and results are also in Table A below.

TABLE A

|  | RANDOM COPOLYMER | | | | | SYNDIOTACTIC PP | | |
| --- | --- | --- | --- | --- | --- | --- | --- | --- |
|  | 1 | 2 | 3 | 4 | 5 | 6 | 7 | 8 |
| CT PP* | 50 | 40 | 50 |  |  |  |  |  |
| RCP** |  |  |  | 50 | 40 |  |  |  |
| ECR-143H+ | 50 | 60 |  |  |  |  | 50 |  |
| ECR 327++ |  |  | 50 | 50 | 60 |  |  |  |
| Syndiotactic PP (SPP) |  |  |  |  |  | 100 | 50 | 50 |
| ECR 111 |  |  |  |  |  |  |  | 50 |
| 1" × 1" × 500 g Al/Al |  | 105.7° C. | 81.7° C. | 63.3° C. |  |  |  |  |
| Opp/Opp | 117.8° C. | 106.2° C. |  |  | 141+° C. |  |  |  |
| PAFT.° C. (°C.) Al/Al | 27° C. | RT | RT | 28° C. | RT |  | 21° C. | 21° C. SF |
| SAFT° C. (°C.) |  |  |  |  |  |  |  |  |
| 1" × 3" × 100 g (300 F/2 min) |  |  |  |  |  |  |  |  |
| Opp/Opp | 141+° C. | 118° C. | 61° C. | 285+° C. | 285+° C. | 29° C. | 38° C. CF |  |
| T-PEEL (lbs/in) Al/Al | 0.04 CF | 0.035 CF | 0.05 CF | 0.48(3) | 0.65(3) |  | 0.15 AF | 3.5 AF/CF |
| (300 F/2 minutes) |  |  |  |  |  |  |  |  |
| Opp/Opp |  | 0.1 CF | SF | SF | SF |  | 0.15 AF | 0.12 AF |

|  | SYNDIOTACTIC PP | | | | | ISOTACTIC PP | | |
| --- | --- | --- | --- | --- | --- | --- | --- | --- |
|  | 9 | 10 | 11 | 12 | 13 | 14 | 15 | 16 |
| ECR 327++ | 50 |  |  |  |  |  |  |  |
| Syndiotactic PP (SPP) | 50 | 50 | 50 | 70 | 40 |  |  |  |
| ECR 111 |  |  |  |  |  | 50 | 50 | 50 |
| Escorez 2520 |  | 50 |  |  |  |  |  |  |
| Escorez 5380 |  |  | 50 |  | 20 |  |  |  |
| Parapol 1300 |  |  |  | 30 | 40 |  |  |  |
| IPP (056) |  |  |  |  |  | 50 |  |  |
| IPP (074) |  |  |  |  |  |  | 50 |  |
| IPP (061) |  |  |  |  |  |  |  | 50 |
| SAFT° C. (°C.) |  |  |  |  |  |  |  |  |
| PAFT.° C. (°C.) Al/Al | 86° C. | 21° C. | 90° C. | 23° C. | 34° C. |  |  |  |
| 1" × 3" × 100 g (300 F/2 min) |  |  |  |  |  |  |  |  |
| Opp/Opp | 33° C. | 58° C. | 84° C. | 23° C. | 23° C. | 54° C. | 112° C. | 58° C. |
| T-PEEL (lbs/in) Al/Al | 0.28 AF | 0.18 AF | 2.2 AF | 0.5 AF | 0.15 AF | 0.33 AF | 0.46 AF | 1.7 AF |
| (300 F/2 minutes) |  |  |  |  |  |  |  |  |
| Opp/Opp | 0.18 AF | 0.10 AF | 13.5 AF | 002.5 AF | 1.3 AF | 0.7 AF | 1.3 AF | 1.23 AF |

*CT PP of Mw 32,000 Mw/Mw 1.7 Mp = 144.7° C.
**RCP (PD 9282) random copolymer of propylene at 5 wt % etylene
+ECR 143H Liquid Aliphatic tackifying resin Tg-21° C.
++ECR-327 Liquid Hydrogenated Cyclic tackifying resin Tg-14° C.
ECR-III Aliphatic Tackifying resin Tg 29.4° C.
Escorez 2520 c5/cg Resin Tg - 16° C.
Escorez 5380 Hydrogenated Cyclic tackify resin Tg 30+ C.
Parapol 1300 Ethylene/butene liquid tackifier
SPP = Mw 108,000, MWD 1.6 Mp's 138° C. + 127° C. Tg = .06° C.
(3)Failure mode appears adhesive but the non adhesive side is sticky
CT PP = controlled tacticity PP
IPP(056) = Mw 32,000; MP 123° C.; 6 wt % 1-hexene
IPP(074) = Mw 185,000; MP 114° C.; 6% 1-hexene
IPP(061) = Mw 18,900; MP 94° C.; 17% 1-hexene
RT = Room temp. failure
AF = Adhesive failure
CF = Cohesive failure
SF = Substrate failure
X = Tested 24 hours after bonding
Y = Tested at 310° F.

Note that when comparing Examples 4 and 9, the syndiotactic HMA (a) shows three times better PAFT than the random copolymer(4), i.e., 86° C. vs 28° C. The syndiotactic HMA(9) also displayed at least 100% better PAFT than Example 3, (CT PP), as the CTPP failed at room temperature.

In addition the syndiotactic HMA of Example 7 displayed three times better T-peel than the random polypropylene blend (Ex 1), i.e. 0.15 vs. 0.04. Likewise, the syndiotactic PP HMA (Ex 8) displayed three to ten times better T-peel when compared to the isotactic HMA (i.e. 3.5 vs. 0.33/0.46/1.7) (Ex.'s 14,15,16).

EXAMPLE 17

Example 17 is a comparison of isotactic and syndiotactic C3/C6 copolymers containing three different levels of hexene comonomer in each case. These copolymers were melt blended with hydrogenated C5 tackifier (ECR-111~) in a ratio of 1:1 by weight. These materials are compared to a commercially available Eastman C3/C6 copolymer with 32-36% 1-hexene comonomer (See U.S. Pat. No. 5,021,257 to Foster, issued Jun. 4, 1971). Each of these adhesive blends were bonded after 1, 5, and 10 minutes of open time and then debonded at 30 minutes and 24 hours after bonding. The data are presented in Table 1.

TABLE 1

| | | ISOTACTIC Propylene 1-hexene copolymer | | | | SYNDIOTACTIC Propylene 1-hexene copolymer | | |
|---|---|---|---|---|---|---|---|---|
| | % Hexene | 6 | 17 | 20 | EASTMAN | 6 | 10 | 17 |
| | Melt Point (C.) | | | | C3/C6 | | | |
| Open Time* | Molecular Wt. | 123 | 94 | 89 | COPOLYMER | 112 | 99 | none |
| Before Bonding | Set Time Prior to Debonding | 32k | 25k | 19k | 32-36 | 96k | 134k | 145k |
| | | Peel strength, lbs/in. | | | | | | |
| 1 minute | 30 minutes | .04 A | 14.5 C | 13.6 C | 8.0 C/A | 13.5 C | 13.1 C/A | 13.4 ? |
| | 24 hours | .02 A | 13.3 C | 14.4 C | 8.3 C/A | 2.0 A | 0 | 14.25 C |
| 5 minutes | 30 minutes | 0 | 13.4 C | 12.1 C | 9.4 C/A | 13.3 C | 13.6 C/A | 13.8 C |
| | 24 hours | 0 | 2.0 C | 3.0 C | 9.3 C/A | .01 A | .04 A | 14.0 C |
| 10 minutes | 30 minutes | 0 | 14.4 C | 13.3 C | 10.3 C/A | 14.0 A | 12.3 C | 13.9 C |
| | 24 hours | 0 | 2.8 A | 2.3 A | 9.6 A | .02 A | .03 A | 14.0 C |

*All samples heated 5 minutes at 150° C. prior to bonding
**All copolymers melt blended 1:1 by weight with hydrogenated C5 tackifier C indicates cohesive failure, A indicates adhesive failure and C/A indicates mixed mode failure. The significant findings of all of these data are:

(1) The 17 and 20% 1-hexene ISOTACTIC copolymers exhibit excellent peel strength after 10 minutes open time when debonded after 30 minutes, but the bond strength falls way off when debonded after 24 hours;

(2) A comparable 17% 1-hexene SYNDIOTACTIC copolymer exhibits virtually identical bond strength to the isotactic initially (after 30 minutes) and maintains that bond integrity after 24 hours;

(3) 6% hexene comonomer in the isotactic structure is insufficient to induce the slow crystallization required for long open time initially (1 minute open time is already too long) however it does appear to be sufficient in the syndiotactic structure; and (4) The Eastman C3/C6 blend also maintains its bond strength when debonded after 24 hours just as the syndiotactic copolymer does, however the syndiotactic copolymer blend exhibits a 55% increase in peel strength over the Eastman system.

Figure 1:
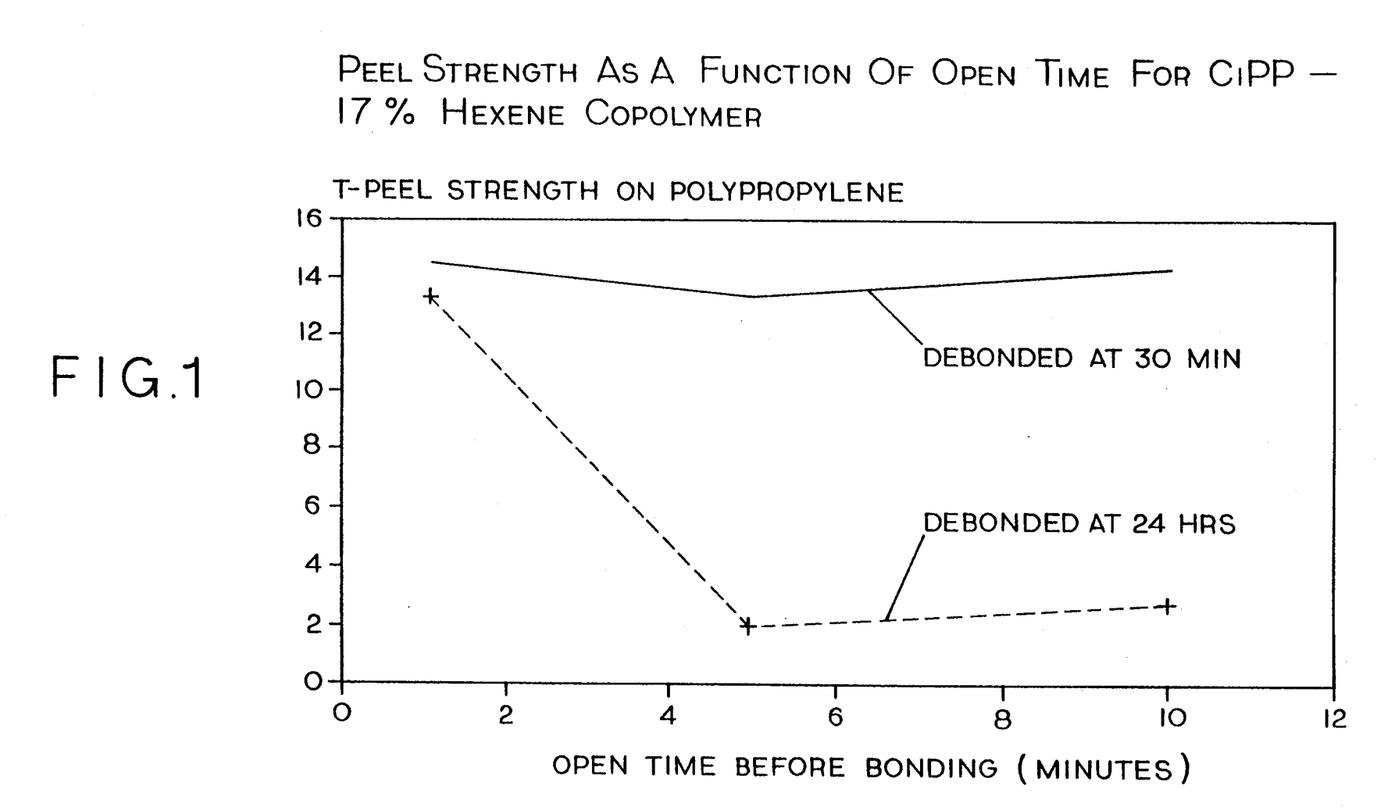
FIG. 1 is a graph depicting peel strength as a function of open time for an isotactic copolymer (17% hexene-1).
Figure 2:
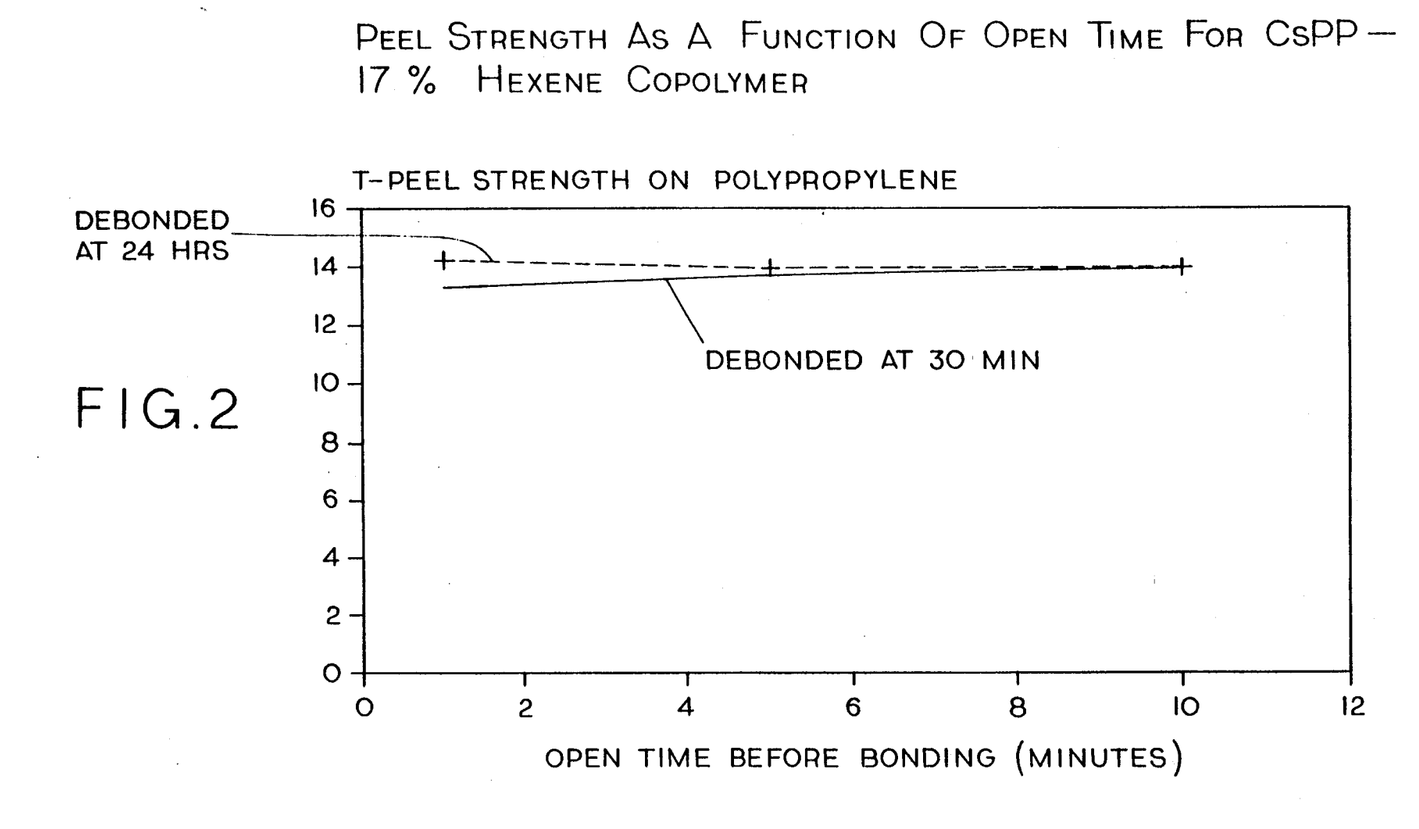
FIG. 2 is a graph depicting peel strength as a function of open time for an syndiotactic copolymer (17% hexene-1).

Findings 1 and 2 are also illustrated in FIGS. 1 and 2 showing the 24 hour peel strength dropping in the case of the isotactic copolymer (FIG. 1) and remaining around 14 lbs./in. in the case of the syndiotactic copolymer (FIG. 2).

Listed in Table 2 are T-peel data comparing syndiotactic homopolymer to syndiotactic C3/C6 copolymer. These materials were melt blended with ECR-111 and bonded to aluminum, polyethylene, polypropylene, and plasticized vinyl substrates. Samples were debonded after 2 hours.

TABLE 2

| Time between bonding and debonding | s-PP homopolymer ECR-111 (1:1 ratio by wt.) 2 Hours | C3/C6 copolymer ECR-111 (1:1 ratio by wt.) 2 Hours |
|---|---|---|
| T-Peel, lbs./in. | | |
| Aluminum | 1.95 (AF) | 11.6 (CF) |
| Polyethylene | 3.7 (CF) | 14.25 (CF) |
| Polypropylene | 0.3 (AF) | 20.2 (CF) |
| Plasticized Vinyl | 0.11 (AF) | 7.5 (CF) |

(AF)adhesive failure
(CF)cohesive failure

Figure 3:
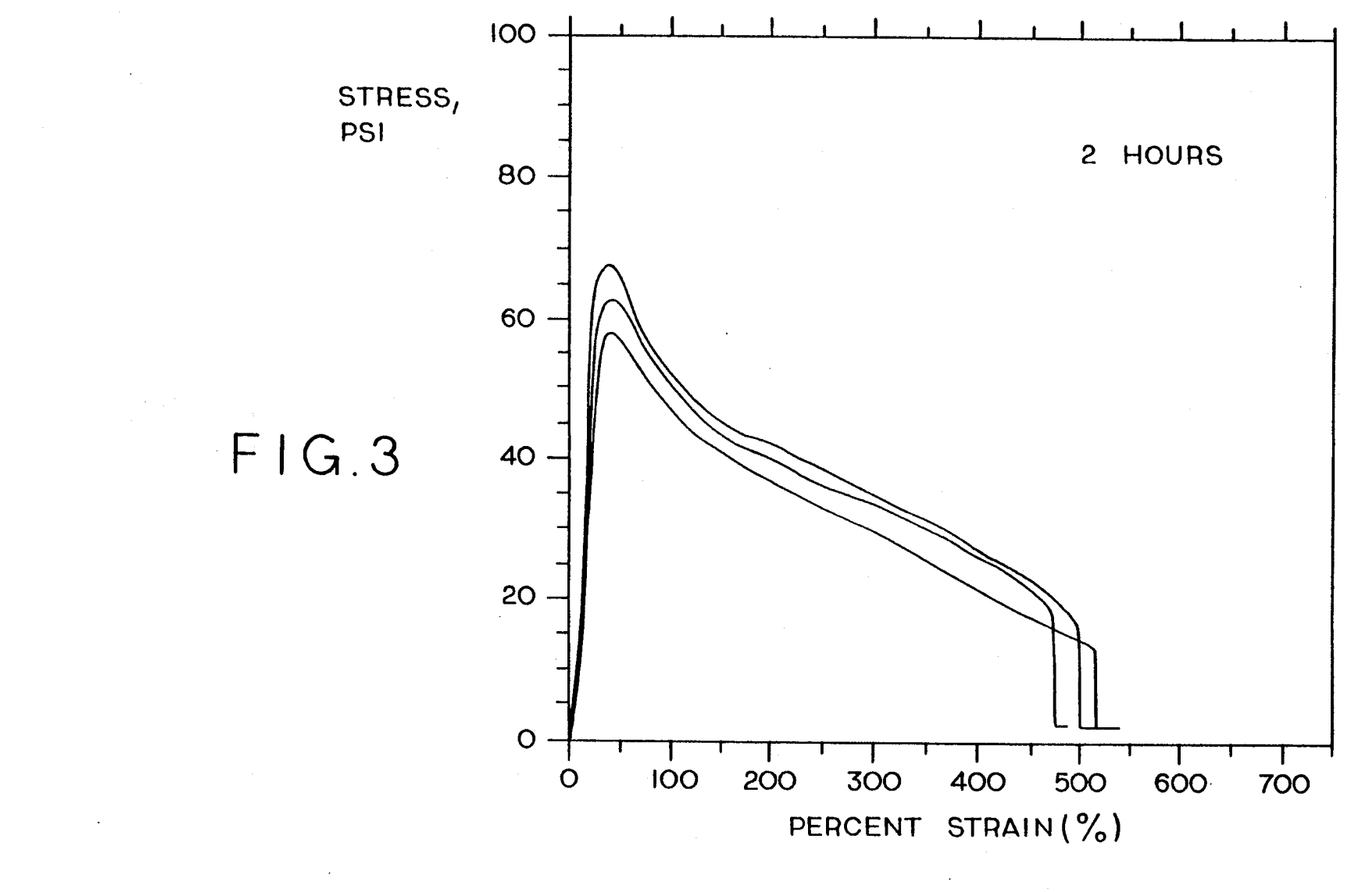
FIG. 3 and FIG. 5 illustrate stress-stain curves on a C6/C3 copolymer/ECR-111 system containing 6% hexene.
Figure 5:
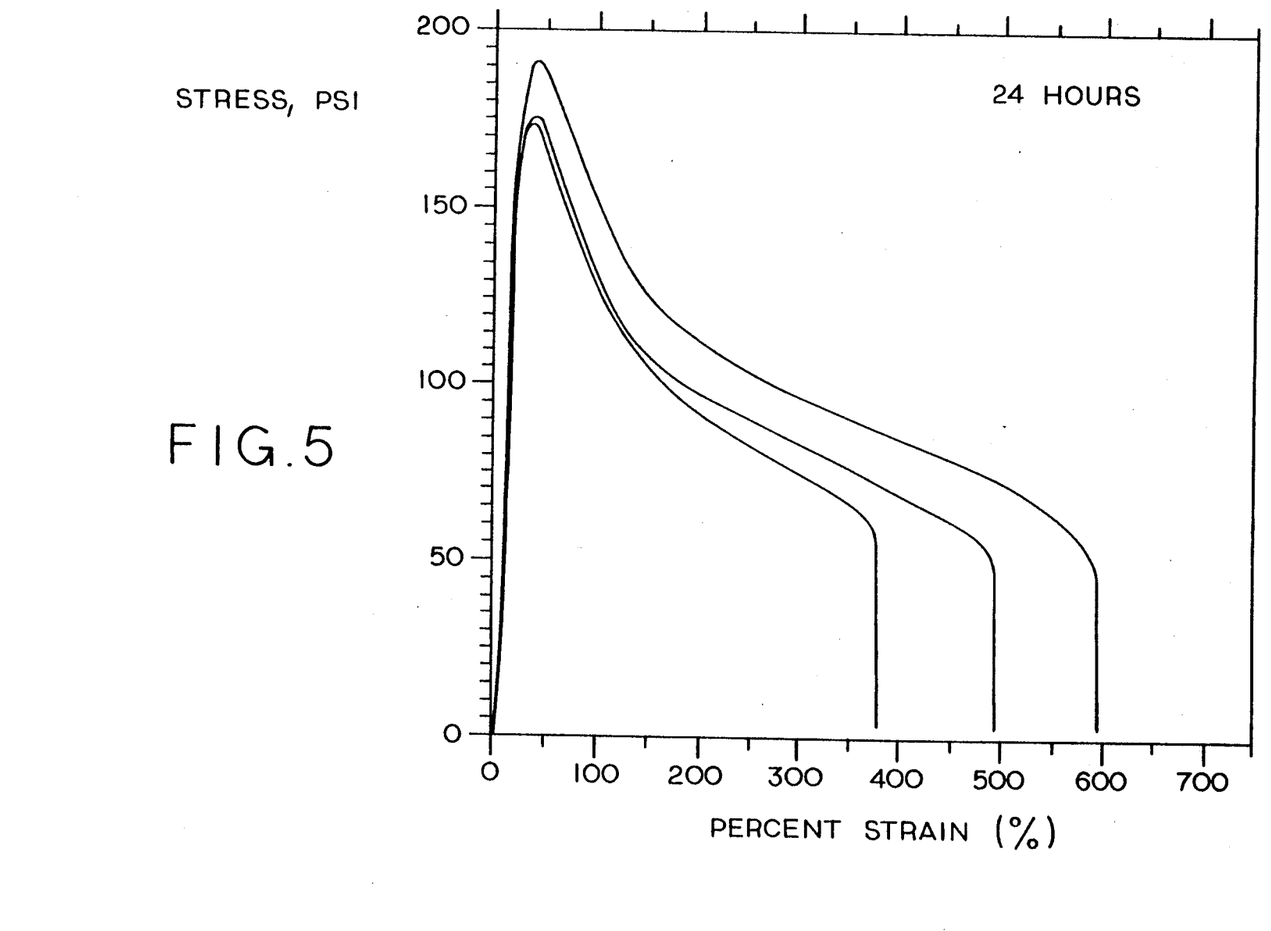

The C3/C6 copolymer system far outperforms the homopolymer on every substrate tested. In fact, the balance of peel on this broad selection of substrates is outstanding. It is known that strong T-peel results on one substrate do not always translate to strong T-peel results on a second substrate. Applicants excellent balance lends to much greater flexibility in choosing dissimilar substates for bonding. FIG. 3 and FIG. 5 illustrate stress-strain curves on a C3/C6 copolymer system containing 6% hexene. Again this is a 1:1 blend with ECR-111. These were tested 2 hours and 24 hours after the pads were molded. Notice the dramatic increase in tensile stress at yield from approximately 60 psi at 2 hours to around 175 psi after 24 hours. Correspondingly, toughness increases from 167.4 to 475.6 in.-lbs./in.3/ and the modulus increases from 327.5 psi to 1420 psi. These values are indicative of the very slow crystallization process inherent in these copolymers and illustrate the improved toughness of these systems with time.

Figure 4:
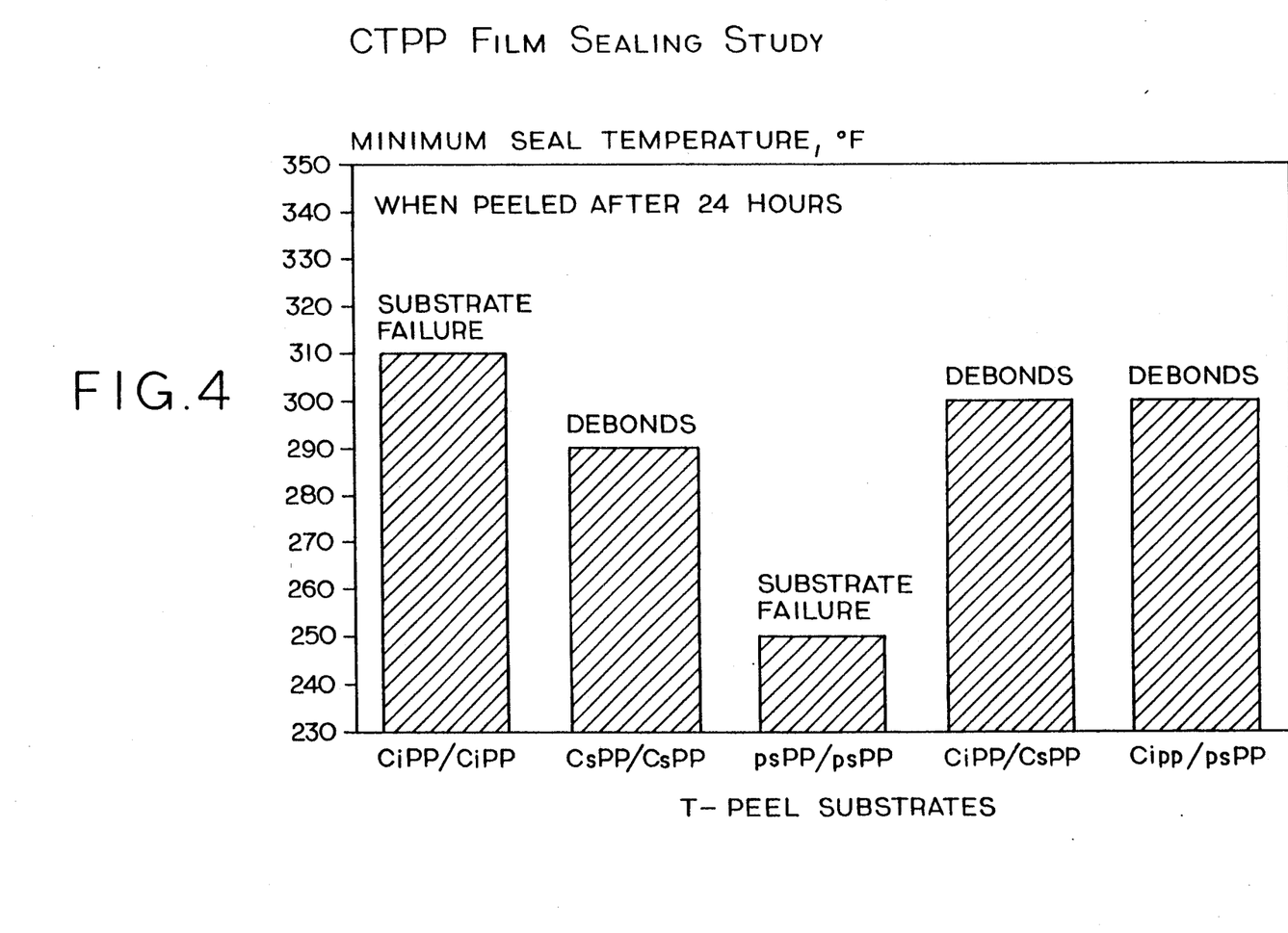
FIG. 4 depicts the results of a study where various controlled tacticity polypropylene (CTPP) films were heat sealed to each other with no adhesive sandwiched in the middle.

FIG. 4 depicts the results of a study where various controlled tacticity polypropylene (CTPP) films were heat sealed to each other with no adhesive sandwiched in the middle. Since all the previous work was done utilizing an isotactic PP film for testing, a determination of whether an isotactic PP film would, in fact, remain sealed to a syndiotactic film was made. The minimum seal temperature on the y axis indicates the lowest temperature at which a bond was formed which could not be pulled apart easily by hand. Three types of film were tested: controlled isotactic homopolymer (CiPP), controlled syndiotactic homopolymer (CsPP), and purified (deashed) syndiotactic homopolymer (psPP). Only the CiPP and the purified syndiotactic PP sealed to themselves remained sealed after 24 hours. All other combinations debonded after 24 hours. The most notable finding of this study is that the purified (deashed) syndiotactic polypropylene has a 40° F. lower minimum seal temperature than its unpurified analog, illustrating the value of utilizing a purified version of the SPP polymer.

As is apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

What is claimed is:

1. A hot melt adhesive comprising tackifier and syndiotactic propylene homopolymer or copolymer, said homopolymer or the propylene segment of the copolymer comprising at least about 80% racemic dyads and said homopolymer or copolymer having a melting point of from 100° C. to 180° C.

2. The hot melt adhesive of claim 1, wherein said homopolymer or propylene segment of the copolymer comprises at least 85% racemic dyads.

3. The hot melt adhesive of claim 1, wherein said copolymer comprises ethylene comonomer.

4. The hot melt adhesive of claim 1, wherein the comonomer of the copolymer is a $C_4$ to $C_{12}$ alpha-olefin.

5. The hot melt adhesive of claim 1, wherein the copolymer comonomer is selected from the group consisting of 1-pentene, 1-hexene, 1-heptene and 1-octene.

6. The hot melt adhesive of claim 1, wherein said copolymer comprises 1-hexene.

7. The hot melt adhesive of claim 4, wherein said copolymer comprises 1 to 50 weight % of comonomer.

8. The hot melt adhesive of claim 4, wherein said copolymer comprises 3 to 20 weight % of comonomer.

9. The hot melt adhesive of claim 4, wherein the comonomer is hexene-1 and is present at 3 to 20 weight %.

10. The hot melt adhesive of claim 1, wherein the copolymer comprises 5 to 18 weight % hexene-1.

11. The hot melt adhesive of claim 1, wherein the tackifier is present at 1 to 70 weight %.

12. The adhesive of claim 1, wherein the tackifier is present at 40 to 60 weight %.

13. The adhesive of claim 1, wherein the tackifier is a hydrogenated resin.

14. The adhesive of claim 1, wherein the tackifier is a hydrogenated cyclic resin.

15. The adhesive of claim 1, wherein the tackifier is an aliphatic resin with a softening point of about 12° to about 100° C.

16. The adhesive of claim 1, where the syndiotactic propylene homopolymer or copolymer is deashed.

17. The holt melt adhesive of claim 1, wherein the propylene polymer is said propylene homopolymer.

18. A hot melt adhesive produced by a process comprising combining tackifier with syndiotactic propylene homopolymer or copolymer, said homopolymer or the propylene segment of the copolymer comprising at least about 80% racemix dyads and said homopolymer or copolymer further having a melting point of from 100° to 180° C. wherein the hot melt adhesive is characterized by an open time of 5 minutes or more.

19. The product of claim 18, wherein the hot melt adhesive is characterized by a peel strength after 24 hours at or above the peel strength at 10 minutes.

20. The product of claim 18, wherein the hot melt adhesive is characterized by a peel strength after 24 hours about the same or above the peel strength at 10 minutes.

21. The product of claim 18, wherein the hot melt adhesive is characterized by an open time of about ten minutes or more.

* * * * *